United States Patent [19]

Meyer

[11] Patent Number: 4,957,372

[45] Date of Patent: Sep. 18, 1990

[54] MEANS FOR IMPROVING THE UNIFORMITY-PERFORMANCE OF COLD FEED RUBBER-EXTRUDERS

[75] Inventor: Paul Meyer, Locarno-Muralto, Switzerland

[73] Assignee: Frenkel C-D Aktiengesellschaft, Vaduz, Liechtenstein

[21] Appl. No.: 401,472

[22] Filed: Aug. 29, 1989

Related U.S. Application Data

[63] Continuation of Ser. No. 331,808, Apr. 3, 1989, abandoned.

[30] Foreign Application Priority Data

Apr. 7, 1988 [GB] United Kingdom ............ 8808107

[51] Int. Cl.$^5$ ............................................. B28C 1/16
[52] U.S. Cl. ........................................ 366/76; 366/85; 366/90; 366/324
[58] Field of Search ............... 366/76, 77, 79, 80, 366/83, 84, 85, 88, 89, 318, 323, 324; 425/207, 208, 209

[56] References Cited

U.S. PATENT DOCUMENTS

| | | | |
|---|---|---|---|
| 3,375,549 | 4/1968 | Geyer | 366/83 |
| 4,136,969 | 1/1979 | Meyer | 366/89 |
| 4,178,104 | 12/1979 | Menges | 366/90 |
| 4,184,772 | 1/1980 | Meyer | 366/77 |
| 4,462,692 | 7/1984 | Meyer | 366/79 |
| 4,494,877 | 1/1985 | Upmeier | 425/208 |

FOREIGN PATENT DOCUMENTS 528792 8/1956 Canada ................ 366/90

*Primary Examiner*—Robert W. Jenkins
*Attorney, Agent, or Firm*—Alan A. Gsontos

[57] ABSTRACT

The increasingly high standards of consistency and uniformity demanded of cold feed rubber extruders are met by providing notches in the flights of the screw at least in the feed-inlet of the extruder. The notches are at a lead-angle greater than that of the extruder screw flights, so to pull the rubber and advance it positively. Throttling means are used to adjust the amount of squash-back and there is an independently variable-speed drive for a feed roller in the feed inlet.

20 Claims, 1 Drawing Sheet

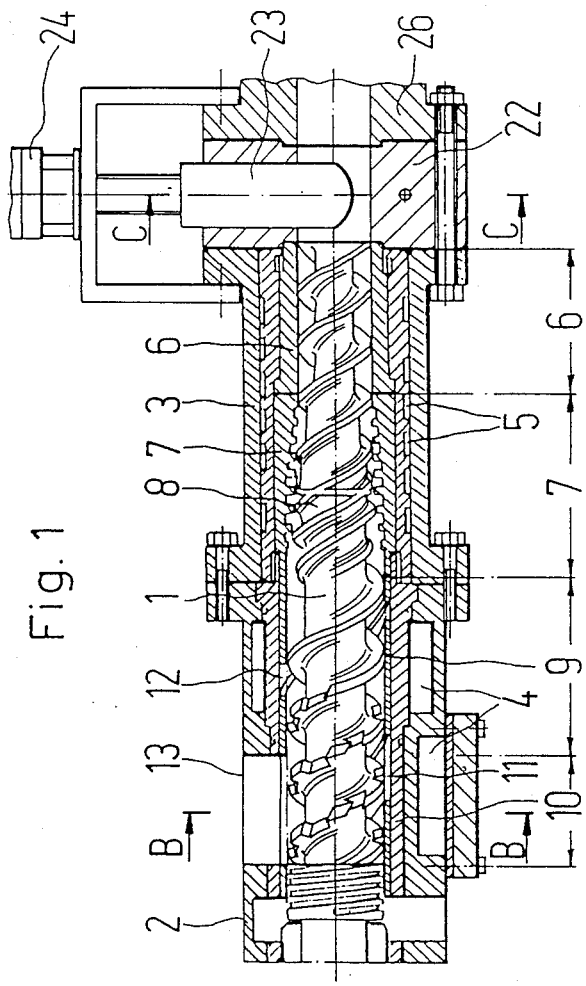
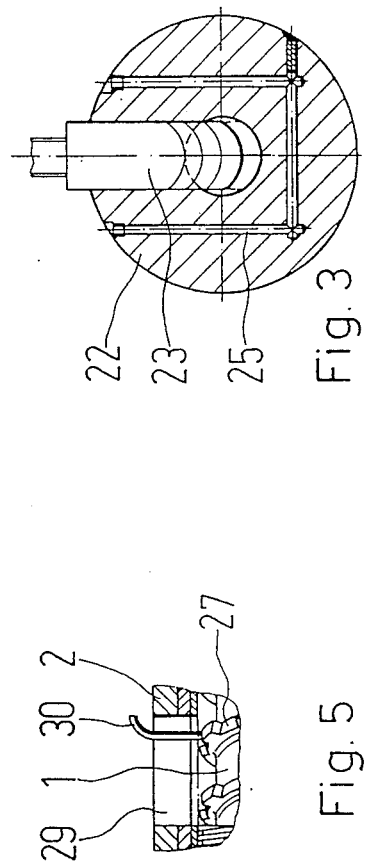
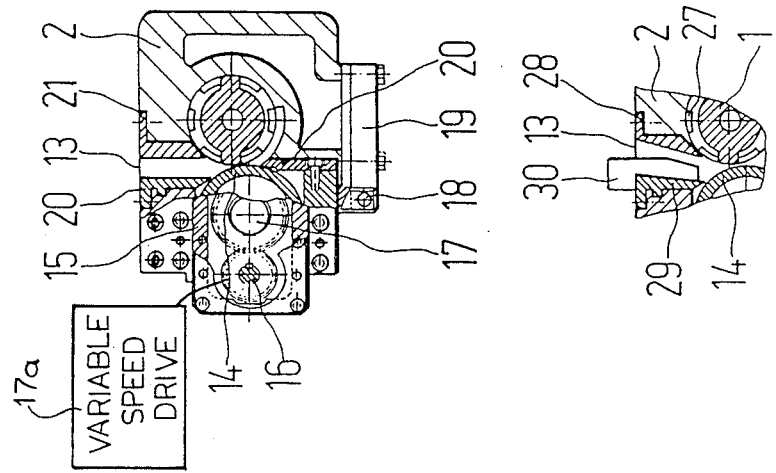

MEANS FOR IMPROVING THE UNIFORMITY-PERFORMANCE OF COLD FEED RUBBER-EXTRUDERS

This is a continuation of copending application Ser. No. 07/331,808 filed on Apr. 3, 1989, now abandoned.

Cold feed rubber extruders, generally comprising a feed opening, a compression section, a plasticising section and an exit section leading to an extrusion head, have been replacing warm feed rubber extruders in the rubber industry.

With advances in design, mainly in the plasticising sections, the range of rubber compounds has been extended to include compounds which have been found difficult to extrude on account of high viscosity (Mooney values), nerve (natural rubber compounds) hardness or high heat build-up. However, outputs of a given size of extruder had to be considerably reduced for the more difficult compounds and the quality factor of uniformity of the extrudate has been hard and, for some compounds, not possible to obtain. Such uniformity is measured in terms of weight per unit length, of dimensional stability, or of temperature distribution both within the cross-section of and along the length of the extrudate.

Measurements of uniformity on groups of samples have been by statistical ratios: such as Standard Deviation over Mean Value which has to be a fraction of 1% to denote high quality, or Process Capability Indices Cpk defined to a limiting maximum and minimum value, which have to be above unity and the higher the better. These different indices denote different aspects of uniformity. In this case, the maximum and minimum values in Cpk's referred to are only 1% above and below the mean value respectively, as distinct from the 2% so far applied to production evaluation of cold feed extruders.

Designers have attempted to meet these demands by making cold-feed extruders longer, with only limited success and at the expense of higher extrusion temperatures proving a ceiling on output.

Experience and test work have shown that non-uniformity basically stems from widely varying conditions in the feed-opening and in the compression-section. Different extremes can be observed:

On the one hand, starve-feeding even with a feed strip or strips or with a sheet of uniform cross-section, makes it very difficult to obtain a fixed position along the length of the compression-section at which the screw is full. Thus there is no fixed datum-point for pressure-buildup to start from—especially as the rubber is not yet plasticised and may move about as chunks of different sizes.

On the other hand, feed-aids which exert a positive pressure may act either periodically (regularly or irregularly), such as ram feeders, or they may act in a more or less constant fashion though they still have to regulate the feed-input, such as e.g. a miniature two-roll-mill with a wide gap, positioned above the feed box and speed controlled by back pressure.

Though these positive pressure devices make certain that the screw is full where it enters the compression-section, they do not prevent squash-back. Therefore, they both introduce non-uniformities by forcing into the screw fresh feed, as well as squash-back in the form of as yet unplasticised lumps and partly plasticised flowable material, in proportions which vary all the time and thereby preclude a uniform pressure-buildup.

The standard device of the cold feed extruder industry, the feed-roller geared to the screw in a feed-box sufficiently open to permit the formation of a visually stable "rolling bank" has also proved incapable of keeping up with the demands of rising standards of uniformity—especially as the more exact measurements and the statistically more sophisticated Process Capability Indices have shown up unacceptable non-uniformities in what appeared to be stable conditions of operation. This applies especially to compounds which are difficult to extrude on account of high Mooney viscosity, hardness (also on account of fillers) or toughness (nerve in NR compounds).

It was surmised that these non-uniformities also related to variations in the composition of the stock as it entered the compression-zone, as between a number of unplasticised or hardly plasticised lumps and the squash back of more plasticised stock which would fill the interstices between such lumps.

A test was carried out to check the validity of the following assumed conditions for uniformity, namely:
a. a fixed datum position for pressure-buildup to start from in a full screw and
b. a uniform ratio of fresh feed to partly plasticized but already flowable back-squash in the screw at that datum position.

To this end, an extruder was used which was not provided with a driven roller or any other feed-aid, but having the screw flight cut at regular intervals at an angle of 45° to planes normal to the screw axis so that the screw itself could could positively grip the feedstrip. Moreover, together with a feed pocket and a 360° Spiral undercut in the compression-zone (U.S. Pat. No. 4,462,692) a positive cutting- and preplasticizing- action was caused to take place between the screw and the undercut, which was designed as a double one. An adjustable throttle was positioned between the outlet-end of the screw and the extrusion-head. As a key-measure, the feed-opening of length of about one screw-diameter (D) and width of about ⅓ D, was compartmented at a distance of about 0.8 D by a partition across it and extending right down to the screw, so as to partly envelop the screw with its lower edge. The feed was introduced as normal feed-strip, taking care to avoid external hang-ups, behind the partition. The 0.2 D length next to the entry of the compression-section was left open to void squash-back.

With the throttle being set to produce the desired extrusion conditions, this arrangement produced excellent uniformity by any index, while voiding varying amounts of squash-back under varying conditions of operation, from about 1% at low speeds in some cases to 30% or more of the throughput in others.

However, voiding part of the squash-back is not considered a practical solution, even though it is possible to re-introduce this (possibly after cooling) with the fresh feed. Not only does this require more mechanical complexity, but it introduces additionally material of a different viscosity level into the feed.

It is an object of the invention to produce high levels of uniformity in a cold feed extruder (as measured by Statistical Ratios to tightened limits) for compounds in general, but especially for compounds hitherto difficult to extrude, on account of high Mooney viscosity, of hardness (also through fillers) or toughness (e.g. nerve in Natural Rubber compounds), or combinations thereof.

It is a further object of this invention to achieve such uniformity-levels without, in practice, prejudicing the output performance and temperature-threshold of the extrudate, over and above the conditions set in these respects by the basic construction of the extruder, that is, mainly by the construction of the plasticising section. To achieve these objects, this invention provides:

A cold feed extruder comprising a screw rotatably mounted in a barrel, with a feed-inlet including a feed pocket, a compression-section, a plasticizing section and an exit-section being formed by these components and a feed-roller forming a part of the feed-inlet, with the combination of:

providing the said screw at least over the length of the said feed-inlet with notches cut across the screw-flights at a lead-angle greater than that of these flights, for providing a positive pulling in and forward transport of fresh feed; providing a throttling means usable for achieving a required degree of plastification and for adjusting the amount of squash-back of partly plasticised feed from the screw into the feed inlet;

providing an independently variable speed drive for the said roller in said feed-inlet, the said roller in the feed-inlet being cored for a tempering fluid, for exerting control over the supply of fresh feed; where by this combination of features the screw is kept running full at the inlet to the compression-zone and the composition of its contents as of fresh feed and of squash-back from the rolling bank is kept constant.

In preferred embodiment, the said screw is provided with the said notches part of the way into the compression-section, the said notches continually decreasing in depth along the length of said screw in the compression-section and the said compression-section is provided with a spiral undercut emerging from the feed pocket in said feed-inlet, the said spiral undercut continually decreasing in cross-sectional area and extending at least a part of a turn around the inside wall of said barrel.

In another preferred embodiment, the feed inlet opening is shaped for guiding the flow of fresh feed towards the feed-roller and away from the screw. Such shaping may be provided by insert pieces, which may be interchangeable. Such an insert piece may also be provided with a lateral wall extending across but not joining the side-walls of the feed inlet for restraining the fresh feed towards the back of the screw.

The invention will now be described by way of example and in some detail with reference to the accompanying drawing in which:

FIG. 1 is a sectional elevation of a rubber extruder embodying the features of this invention;

FIG. 2 is a cross-section through the casing and the screw at position BB in FIG. 1, the section being through the feed-opening and showing particularly the feed-roller, independently driven relative to the screw;

FIG. 3 is a cross-section through the throttle at position CC in FIG. 1;

FIG. 4 is a part view of a section like FIG. 2, showing a different internal shape of the feed inlet;

FIG. 5 is part view of a section like FIG. 1, corresponding to FIG. 4 and showing the alternative version of the feed inlet in sectional side elevation.

In FIG. 1, the extruder-screw 1 is shown unsectioned in the sectioned housing 2 of the feed inlet, the sectioned compression-section and the sectioned extruder barrel 3. The housings are shown with passages 4 and 5 respectively for a heating/cooling fluid. The components adjacent to the screw are formed by sleeves: At the outlet end there is a plain cylindrical sleeve 6. There is a Transfermix sleeve 7 in the plasticizing/mixing section of the extruder for cooperating with a corresponding Transfermix section 8 of the screw (U.S. Pat. Nos. 4,136,969 and/or 4,184,772). In the compression section there is sleeve 9 and under the inlet opening there is sleeve 10. The feed-pocket 11 in sleeve 10 extends under the inlet opening and runs into the spiral undercut 12 in sleeve 9 where the screw enters the barrel and carries on with its continuously reducing width for 360° round the screw, to end just before the end of the compression section, as shown in U.S. Pat. No. 4,462,692.

As shown in FIG. 2, the inlet 13 is shaped by inserts 20 and 21 and is provided with a feed-roller 14. The feed-roller 14 is shown cored for a tempering fluid and is mounted in housing 15. It is driven through gears 16 and 17 which are themselves driven by a variable speed drive 17a which mainly on account of space considerations is preferably a hydraulic motor. The housing 15 is hinged at 18 to a bottom-plate 19 which is itself bolted to the underside of the inlet-housing 2. The housing 15 of the feed-roller can thus be rotated away from the screw, for example for adjusting the scraper-knife 20 for the roller.

At the outlet-end of the barrel there is bolted on a throttle-flange 22, cored for tempering by way of passages 25 and the throttle being formed by the pin 23. This is adjustable up and down by any convenient mechanical arrangement 24 mounted on a frame and driven electrically or hydraulically. An extrusion-head bolted on to throttle flange 21 is only indicated by way of its flange 26.

At least over the length of the inlet-opening 13, but as shown, also extending over a part of the length of the compression section, the extruder screw flights are provided with spaced cuts 27 at an angle considerable greater than the lead-angle of the screw, preferably at a lead-angle of 45°, as against a normal flight lead-angle between 20° and 25°. These cuts may start at depths of more than half the depth of the flight, and then, especially in the compression-zone, reduce gradually in depth to finally run out, which makes a reduction in volume along the length of the screw parallel to that provided by the spiral undercut in the compression section. In practice for example a length of cut of 20-30 mm measuring along the length of the screw-flight and spaced at the same distance, has been found effective. The main function of the cuts, according to this invention, is to provide edges to grip the fresh feed so that this is pulled into the screw strictly in ratio to the speed of rotation. However, the cuts, in cooperation with the undercut, also provide a pre-plasticizing action of special importance for tough or hard compounds, thereby providing a contiguous mass to form the squash-back and to fill the spaces between pieces of unplasticized feed. FIGS. 4 and 5 show views of a section similar to FIG. 2 and 1 respectively, like numerals denoting like parts, in which bolt-in inserts 28 and 29 provide a different shape of the inlet. This is for guiding the feed-strip or sheet more onto the feed-roller, in order to enhance its action of influencing the supply of fresh feed into the screw by adjustment of the roller-speed relative to that of the screw. Moreover, the insert 29 on the side of the feed-roller has fixed on it a partial partition 30 across the feed-opening 13 which serves to contain the fresh feed in the back of the screw only. This is to avoid that the fresh feed, which will have twists and bends in it, does not get displaced forward in the feed opening, and squash-back moving along the bottom of the helical grooves then emerges at the back-end of the screw, thereby preventing the formation of an even visually stable rolling bank in the first place.

It will be understood that a Multi Cut Transfermix (MCT) plasticizing section 7/8 (U.S. Pat. No. 4,136,969, or 4,184,772 inventor Paul Meyer) is given here by way of example only. Any other type of plasticizing screw/barrel assembly, such as a Plasticscrew with a plain barrel (U.S. Pat. No. 3,375,549. Inventor Paul Geyer), a "pin-type" with pins in the barrel and corresponding circular slots in the screw (U.S. Pat. No. 4,178,104, Inventor Menges et al) or any other platicizing device could also be used. All of these have longer L/D ratios than the MC Transfermix and on account of the resulting higher temperature-thresholds, are less well adapted for use with a throttle and are, in fact, not known to be so used at this time.

With regard to the throttle formed by the flange 22 and the pin 23, it must be stated that, as indicated in FIG. 3, this is adapted to exert a very severe throttling effect by shutting off, when fully closed, the cross-sectional area of flow to about 5%—formed by the segments at the two sides and leakages at the bottom of the pin. Such severe throttling as by completely or nearly pushing pin 23 to its lowest position has been found necessary for tough or hard compounds, just in order to provide the necessary plastification.

This type of throttle which is in practical use has been shown and described because its function is obvious. Other types of throttle have been used which do not add to the effective length of the extruder. One example consists of series of radially arranged, conically shaped pins set around the circumferential cut through the screw-flights, the device being positioned immediately following the plasticizing section at the beginning of sleeve 6. When open, the ends of the pins will be withdrawn into the inside surface of the barrel. When closed, the pins will be right down onto the bottom of the cut through the screw-flights and their conical parts will almost touch one another to be able to produce a throttling action of the severity required.

When used with the said Multi Cut Transfermix plasticizing section in which the main plasticizing action takes place in the zone in which the screw-flights reduce from full depth to zero depth, a throttling device has even been arranged in the screw-flights of the barrel where these are deepest, opposite the zero depth of flight in the screw.

In operation, the throttle is set to produce the plastification required for the compound being extruded, which in any case is influenced by the resistance of the die through which the final shaping of the extrudate takes place. A very restrictive die may make a throttle superfluous for a given range of compounds. This means that for softer and easy-to-extrude compounds the throttle may be left open from the view-point of plastification, but also that it may be possible to apply some throttling simply to affect the squash-back, while remaining within the range of acceptable outputs and extrusion temperatures.

The rolling bank may form with its axis parallel to that of the screw and of the feed-roller, rather low in the slot between them, or, particularly at low speeds, it may form more in the shape of a disc with its axis across the screw-axis.

It is then necessary, for a given compound, extrusion-die, throttle-setting and screw speed as main variables to experiment with the speed of the feed roller—which will generally be run cooled—to obtain in the feed box the conditions for high values of the Process Capability Index (Cpk) in the extrudate. This is a very specific state of dynamic equilibrium between the supply of squash-back to the rolling bank and the supply of fresh feed into the screw, influenced also by the relative movements inside the feed opening.

The range of speed-settings of the feed-roller for this effect, have proved to be very narrow—for example for a passenger compound running with an extruder screw at 36 rpm, a feed roll speed of 19 rpm resulted in a unacceptable Cpk value of 0.8 while a feed-roll speed of 21 provided an acceptable Cpk value of 1.25.

When running the extruder at different speeds, the feed-roller would require a different ratio at different screw speeds. The variation was also marked for different compounds: for example, notably slower than the screw-speed for other compounds, or even well above the screw speed for yet other compounds. For some compounds, the roller speed was above the screw speed at low speed, below the screw speed at high speeds and equal at some point in between.

All this makes it convenient to have the extruder operated by an electronic process-controller, which would be programmed with the values required for a given compound and a given die with a predetermined throttle setting and feed roller speed for a specific screw-speed (output)—in addition to the normal temperature-settings. With the short MC Transfermix for example, there will, in addition to the extrusion head, only be tempering settings for the screw, the inlet and the barrel, the different barrel zones for the long extruders not being there.

Using instrumentation on the extruder, it was found that favorable Process-Capability Indices would occur when the pressure became steady and periodic variations became very small, for example, in the extrusion head. With the use of sophisticated process control equipment, this measured parameter can be used to determine the optimum speed of the feed-roller, in place of the fairly elaborate Cpk measurements, involving the taking, cutting and weighing of many samples. In fact, computer-programs could be devised for a feed-back loop from a pressure-monitor to adjust the speed of the feed-roller with continuous variation of the screw-speed—instead of having sets of dependent variables programmed for different sets of independent variables.

Having thus described the invention, what is claimed is:

1. A cold feed extruder comprising a screw rotatably mounted in a barrel, with a feed-inlet including a feed pocket, a compression-section, a plasticizing section and an exit-section being formed by these components and a feed-roller forming a part of the feed-inlet, with the combination of:

providing the said screw at least over the length of the said feed-inlet with notches cut across the screw-flights at a lead-angle greater than that of these flights, for a positive pulling in and forward transport of fresh feed; providing throttling means usable for achieving a required degree of plastification and for adjusting the amount of squash-back of partly plasticised feed from the screw into the feed inlet; and providing an independently variable speed drive for the said roller in said feed-inlet, the said roller being cored for a tempering fluid, for exerting control over the supply of fresh feed;

where by this combination of features the screw is kept running full at the inlet to the compression-zone and the composition of its contents as of fresh feed and of squash-back from the rolling bank is kept constant.

2. The extruder of claim 1 in which the said screw is provided with the said notches part of the way into the compression-section, the said notches continually decreasing in depth along the length of said screw in the compression-section and in which the said compression-section is provided with a spiral undercut emerging from the feed pocket in said feed-inlet, the said spiral undercut continually decreasing in cross-sectional area and extending at least a part of a turn around the inside wall of said barrel.

3. The extruder of claim 1 or claim 2 in which the feed inlet opening is shaped for guiding the flow of fresh feed towards the feed-roller and away from the screw.

4. The extruder of claim 3 in which shaping of the feed-inlet is provided by interchangeable insert-pieces.

5. The extruder of claim 3 in which an insert-piece has affixed to it a lateral wall extending across but not joining the side-walls of the feed inlet for restraining the fresh feed towards the back of the screw.

6. An apparatus for extruding material, which apparatus includes a tubular barrel; a screw rotatably mounted in the barrel and which screw has a longitudinal central axis and a screw-flight, the screw and barrel cooperate to define a feed-inlet section, a compression section, a plasticizing section and an exit section; a feed-roller located adjacent the feed-inlet section and the screw; and drive means for rotating the screw about the longitudinal central axis; wherein the improvement comprises:
   surface means defining a plurality of notches in the screw-flight, said plurality of notches being located adjacent the feed-inlet section for a length which is at least equal to the length of the feed-inlet section, the lengths being taken in a direction parallel to the longitudinal central axis of said screw, each of said plurality of notches including a surface located at an acute angle relative the longitudinal central axis of the screw which is less than the acute angle of the leading face of the screw-flight relative to the longitudinal central axis of the screw;
   throttling means for adjustably restricting the flow of material from the exit section; and
   variable speed drive means, separate from the drive means associated with the screw, for driving the feed roller at a speed independent of the speed at which the screw is driven.

7. The apparatus set forth in claim 6 further including passage means in the feed-roller for fluid to circulate and regulate the temperature of the feed-roller.

8. The apparatus set forth in claim 6 wherein the compression section is located adjacent the feed-inlet section and further including said plurality of notches extending into the compression section for a predetermined length in a direction parallel to the longitudinal central axis of the screw.

9. The apparatus set forth in claim 8 in which the depth of each notch, taken in a direction radially of the longitudinal central axis of the screw, decreases as said plurality of notches extends from the feed-inlet section to the compression section.

10. The apparatus set forth in claim 6 further including means in the feed-inlet section for guiding fresh feed in a direction toward the feed-roller and away from the screw.

11. The apparatus set forth in claim 10 wherein said guiding means comprises an insert removably attachable to the barrel.

12. The apparatus set forth in claim 11 further including a lateral wall connected to said insert, said lateral wall adapted to be disposed in a plane extending perpendicular to the longitudinal central axis of the screw for restricting the flow of fresh feed in a direction away from the direction of extrudate flow.

13. The apparatus set forth in claim 6 wherein each notch has a width of between about 20 mm to 30 mm taken in a direction substantially parallel to the edge of the screw-flight and each notch is spaced from an adjacent notch between about 20 mm to 30 mm in a direction along the edge of the screw-flight.

14. An apparatus for extruding elastomeric material, said apparatus comprising:
   a barrel;
   a screw rotatably mounted in said barrel and including a helical screw-flight and a longitudinal central axis about which said screw rotates, said screw cooperating with said barrel to define:
      a feed-inlet section located at a first axial end portion of said screw;
      an exit section located at a second axial end portion of said screw opposite said first axial end; and
      a compression section located adjacent said feed-inlet section intermediate said feed-inlet section and said exit section;
   surface means defining a plurality of notches in said screw-flight adjacent said feed inlet section and extending for a length at least equal to the length of said feed-inlet section, the lengths being taken in a direction parallel to the longitudinal central axis of said screw, each of said plurality of notches including a surface disposed at a first acute angle relative to the longitudinal central axis of the screw and which first acute angle is less than a second acute angle at which the leading face of said screw-flight is disposed relative to the longitudinal central axis of said screw;
   a feed roller for cooperating with said screw for drawing fresh feed into said barrel;
   throttling means for adjustably restricting the flow of material from said exit section; and
   variable speed drive means for driving the feed-roller at a speed independent of the speed of rotation of said screw.

15. The apparatus set forth in claim 14 further including passage means in said feed-roller for fluid to circulate and regulate the temperature of said feed-roller.

16. The apparatus set forth in claim 15 further including said plurality of notches extending along said screw-flight into said compression section for a predetermined length in a direction parallel to the longitudinal central axis of said screw.

17. The apparatus set forth in claim 14 in which the depth of each notch, taken in a direction radially of the longitudinal central axis of said screw, decreases as said plurality of notches extends from the first axial end portion of said screw toward the second axial end portion of said screw.

18. The apparatus set forth in claim 14 further including means in said feed-inlet section for guiding fresh feed in a direction toward said feed-roller and away from said screw comprising an insert removably attachable to the barrel.

19. The apparatus set forth in claim 18 further including a lateral wall connected to said insert, said lateral wall adapted to be disposed in a plane extending substantially perpendicular to the longitudinal central axis of said screw for restricting the flow of fresh feed in a direction away from the direction of extrudate flow.

20. The apparatus set forth in claim 14 wherein each notch has a width of between about 20 mm to 30 mm taken in a direction parallel to the edge of said screw-flight and each notch is spaced from an adjacent notch between about 20 mm to 30 mm in a direction along the edge of said screw-flight.

* * * * *